(12) United States Patent
Dong et al.

(10) Patent No.: US 12,489,898 B2
(45) Date of Patent: Dec. 2, 2025

(54) CONTEXT ADAPTIVE BINARY ARITHMETIC CODING (CABAC) PROBABILITY ESTIMATION FOR VIDEO CODING

(71) Applicant: QUALCOMM Incorporated, San Diego, CA (US)

(72) Inventors: Jie Dong, Sunnyvale, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 18/145,399

(22) Filed: Dec. 22, 2022

(65) Prior Publication Data

US 2023/0224464 A1    Jul. 13, 2023

Related U.S. Application Data

(60) Provisional application No. 63/266,623, filed on Jan. 10, 2022.

(51) Int. Cl.
*H04N 19/13* (2014.01)
*H04N 19/184* (2014.01)
*H04N 19/70* (2014.01)

(52) U.S. Cl.
CPC .......... *H04N 19/13* (2014.11); *H04N 19/184* (2014.11); *H04N 19/70* (2014.11)

(58) Field of Classification Search
CPC ....... H04N 19/70; H04N 19/13; H04N 19/184
See application file for complete search history.

(56) References Cited

PUBLICATIONS

Chen J., et al., "Algorithm Description of Joint Exploration Test Model 7 (JEM7)," 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 48 Pages.

Coban M., et al., "Algorithm Description of Enhanced Compression Model 3 (ECM 3)," JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

(Continued)

*Primary Examiner* — On S Mung
(74) *Attorney, Agent, or Firm* — Shumaker & Sieffert, P.A.

(57) ABSTRACT

A video decoder is configured to receive bin values according to a context model, wherein the context model includes one or more probability states and the bin values correspond to one or more syntax elements of the video data; determine a first shift value based on the received bin values; determine a second shift value based on the received bin values; update a first state variable based on the first shift value; update a second state variable based on the second shift value; determine, for a next bin to be decoded, a probability state for the context model based on the first state variable and the second state variable; context decode the next bin to be decoded based on the probability state; and determine values for the one or more syntax elements based on the received bin values and the context decoded next bin value.

30 Claims, 12 Drawing Sheets

(56) References Cited

PUBLICATIONS

Coban M., et al., "Algorithm Description of Enhanced Compression Model 4 (ECM 4)," JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Karczewicz M., et al., "Common Test Conditions and Evaluation Procedures for Enhanced Compression Tool Testing," JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Karczewicz M., et al., "Common Test Conditions and Evaluation Procedures for Enhanced Compression Tool Testing," JVET-W2017-v1, Joint Video Experts Team (JVET) of ITU-T SG 16 WP 3 and ISO/IEC JTC 1/SC 29, JVET-X2017-v1, 24th Meeting, by teleconference, Oct. 6-15, 2021, pp. 1-7.

Seregin V., et al., "AHG12: CABAC Initialization from Previous Inter Slice," JVET-Y0181-v3, Joint Video Experts Team (JVET) of ITU-T SG 16 WP 3 and ISO/IEC JTC 1/SC 29, 25th Meeting, by teleconference, Jan. 12-21, 2022, pp. 1-4.

Seregin V., et al., "EE2-4.2: Cabac Initialization from Previous Inter Slice and Windows Adjustment," JVET-Z0133-1, Joint Video Experts Team (JVET) of ITU-T SG 16 WP 3 and ISO/IEC JTC 1/SC 29, 26th Meeting, by teleconference, Apr. 20-29, 2022, pp. 1-6.

Seregin V., et al., "Exploration Experiment on Enhanced Compression beyond VVC capability (EE2)," JVET-Y2024-v2, Joint Video Experts Team (JVET) of ITU-T SG 16 WP 3 and ISO/IEC JTC 1/SC 29, 25th Meeting, by teleconference, Jan. 12-21, 2022, pp. 1-15.

Xiu X., et al., "AHG12: Improved Probability Estimation for CABAC," JVET-Y0157-v2, Joint Video Experts Team (JVET) of ITU-T SG 16 WP 3 and ISO/IEC JTC 1/SC 29, 25th Meeting, by teleconference, Jan. 12-21, 2022, 12 pages.

Xiu X., et al., "EE2-Test4.1: Improved Probability Estimation for CABAC," JVET-Z0134-v1, Joint Video Experts Team (JVET) of ITU-T SG 16 WP 3 and ISO/IEC JTC 1/SC 29, 26th Meeting, by teleconference, Apr. 20-29, 2022, pp. 1-5.

Xiu X., et al., "EE2-Test4.1: Improved Probability Estimation for CABAC," JVET-Z0134-v2, Joint Video Experts Team (JVET) of ITU-T SG 16 WP 3 and ISO/IEC JTC 1/SC 29, 26th Meeting, by teleconference, Apr. 20-29, 2022, pp. 1-5.

Xiu X., et al., "EE2-Test4.3: Combined Tests of EE2-4.1 and EE2-4.2," JVET-Z0135-v1, Joint Video Experts Team (JVET) of ITU-T SG 16 WP 3 and ISO/IEC JTC 1/SC 29, 26th Meeting, by teleconference, Apr. 20-29, 2022, pp. 1-5.

Xiu X., et al., "EE2-Test4.3: Combined Tests of EE2-4.1 and EE2-4.2," JVET-Z0135-v2, Joint Video Experts Team (JVET) of ITU-T SG 16 WP 3 and ISO/IEC JTC 1/SC 29, 26th Meeting, by teleconference, Apr. 20-29, 2022, pp. 1-5.

Alshin A., et al., "CE1 (subset B): Multi-Parameter Probability Up-Date for CABAC," JCTVC-G764, Joint Collaborative Team on Video Coding (JCT-VC) of ITU-T SG16 WP3 and ISO/IEC JTC1/SC29/WG11, 7th Meeting, Geneva, CH, Nov. 21, 2011-Nov. 30, 2011, Nov. 18, 2011, XP030229950, pp. 1-4.

Browne A., et al., "Algorithm Description for Versatile Video Coding and Test Model 15 (VTM15)," JVET-X2002-v1, Joint Video Experts Team (JVET) of ITU-T SG 16 WP 3 and ISO/IEC JTC 1/SC 29, 24th Meeting, by teleconference, Oct. 6, 2021-Oct. 15, 2021, Dec. 28, 2021, XP093038321, XP030299394, pp. 1-115, pp. 50-52.

Coban M., et al., "Algorithm Description of Enhanced Compression Model 6 (ECM 6)," JVET-AA2025, Joint Video Experts Team (JVET) of ITU-T SG 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54.

International Search Report and Written Opinion—PCT/US2022/053966—ISA/EPO—Apr. 21, 2023 12 Pages.

CONTEXT ADAPTIVE BINARY ARITHMETIC CODING (CABAC) PROBABILITY ESTIMATION FOR VIDEO CODING

This application claims the benefit of U.S. Provisional Patent Application 63/266,623, filed 10 Jan. 2022, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

To reduce the bits needed to code certain syntax elements, some syntax elements may be coded using context adaptive binary arithmetic coding (CABAC). CABAC uses a context to determine the probability that a next bit will have a certain value. This disclosure describes techniques to improve the accuracy of probability estimation for binary arithmetic coders. The techniques may be used for video encoders and video decoders to calculate and update the probability states for context models associated with CABAC. The techniques of this disclosure may be suitable for the binary arithmetic coders where the probability state represents the real probability in the linear domain, such as CABAC as implemented in Versatile Video Coding (VVC).

Typically, a context state is selected as a function of two state variables, a low rate state variable and a high rate state variable. The low rate state variable and the high rate state variable are updated for a next bin based on a value of a previously coded bin. According to the techniques of this disclosure, the low rate state variable and the high rate state variable may additionally be updated based on the specific combination of the values of the last M bins. With existing techniques, if the previous bin had a certain value, then the low and high rate state variables would always be updated in the same manner.

According to the techniques of this invention, however, in two coding scenarios where the previous bin has the same value, the update to the state variables may be different because the last M bins are different, even though the bin to be coded is the same. For example, a video coder may be configured to determine a first shift value based on received bin values and determine a second shift value based on the received bin values. The video coder may then update a first state variable, such as the low rate state variable, based on the first shift value and update a second state variable, such as the high rate state variable, based on the second shift value. The techniques of this disclosure may enable a video coder to select better contexts that enable syntax elements to be signaled with fewer bits, which improves video compression.

According to an example of this disclosure, a method of decoding video data includes: receiving bin values according to a context model, wherein the context model includes one or more probability states and the bin values correspond to one or more syntax elements of the video data; determining a first shift value based on the received bin values; determining a second shift value based on the received bin values; updating a first state variable based on the first shift value; updating a second state variable based on the second shift value; determining, for a next bin to be decoded, a probability state for the context model based on the first state variable and the second state variable; context decoding the next bin to be decoded based on the probability state; and determining values for the one or more syntax elements based on the received bin values and the context decoded next bin value.

According to an example of this disclosure, a device for decoding video data includes a memory configured to store video data; one or more processors implemented in circuitry and configured to receive bin values according to a context model, wherein the context model includes one or more probability states and the bin values correspond to one or more syntax elements of the video data; determine a first shift value based on the received bin values; determine a second shift value based on the received bin values; update a first state variable based on the first shift value; update a second state variable based on the second shift value; determine, for a next bin to be decoded, a probability state for the context model based on the first state variable and the second state variable; context decode the next bin to be decoded based on the probability state; and determine values for the one or more syntax elements based on the received bin values and the context decoded next bin value.

According to an example of this disclosure, an apparatus for decoding video data includes means for receiving bin values according to a context model, wherein the context model includes one or more probability states and the bin values correspond to one or more syntax elements of the video data; means for determining a first shift value based on the received bin values; means for determining a second shift value based on the received bin values; means for updating a first state variable based on the first shift value; means for updating a second state variable based on the second shift value; means for determining, for a next bin to be decoded, a probability state for the context model based on the first state variable and the second state variable; means for context decoding the next bin to be decoded based on the probability state; and means for determining values for the one or more syntax elements based on the received bin values and the context decoded next bin value.

According to an example of this disclosure, a computer-readable storage medium stores instructions that when executed by one or more processors cause the one or more processors to receive bin values according to a context model, wherein the context model includes one or more probability states and the bin values correspond to one or more syntax elements of the video data; determine a first shift value based on the received bin values; determine a second shift value based on the received bin values; update a first state variable based on the first shift value; update a second state variable based on the second shift value; determine, for a next bin to be decoded, a probability state for the context model based on the first state variable and the second state variable; context decode the next bin to be decoded based on the probability state; and determine values for the one or more syntax elements based on the received bin values and the context decoded next bin value.

A device for encoding video data includes a memory configured to store video data and one or more processors implemented in circuitry and configured to determine bin values according to a context model, wherein the context model includes one or more probability states and the bin values correspond to one or more syntax elements of the video data; determine a first shift value based on the received bin values; determine a second shift value based on the received bin values; update a first state variable based on the first shift value; update a second state variable based on the second shift value; determine, for a next bin to be encoded, a probability state for the context model based on the first state variable and the second state variable; and context encode the next bin to be encoded based on the probability state.

The details of one or more examples are set forth in the accompanying drawings and the description below. Other features, objects, and advantages will be apparent from the description, drawings, and claims.

DETAILED DESCRIPTION

Figure 1:
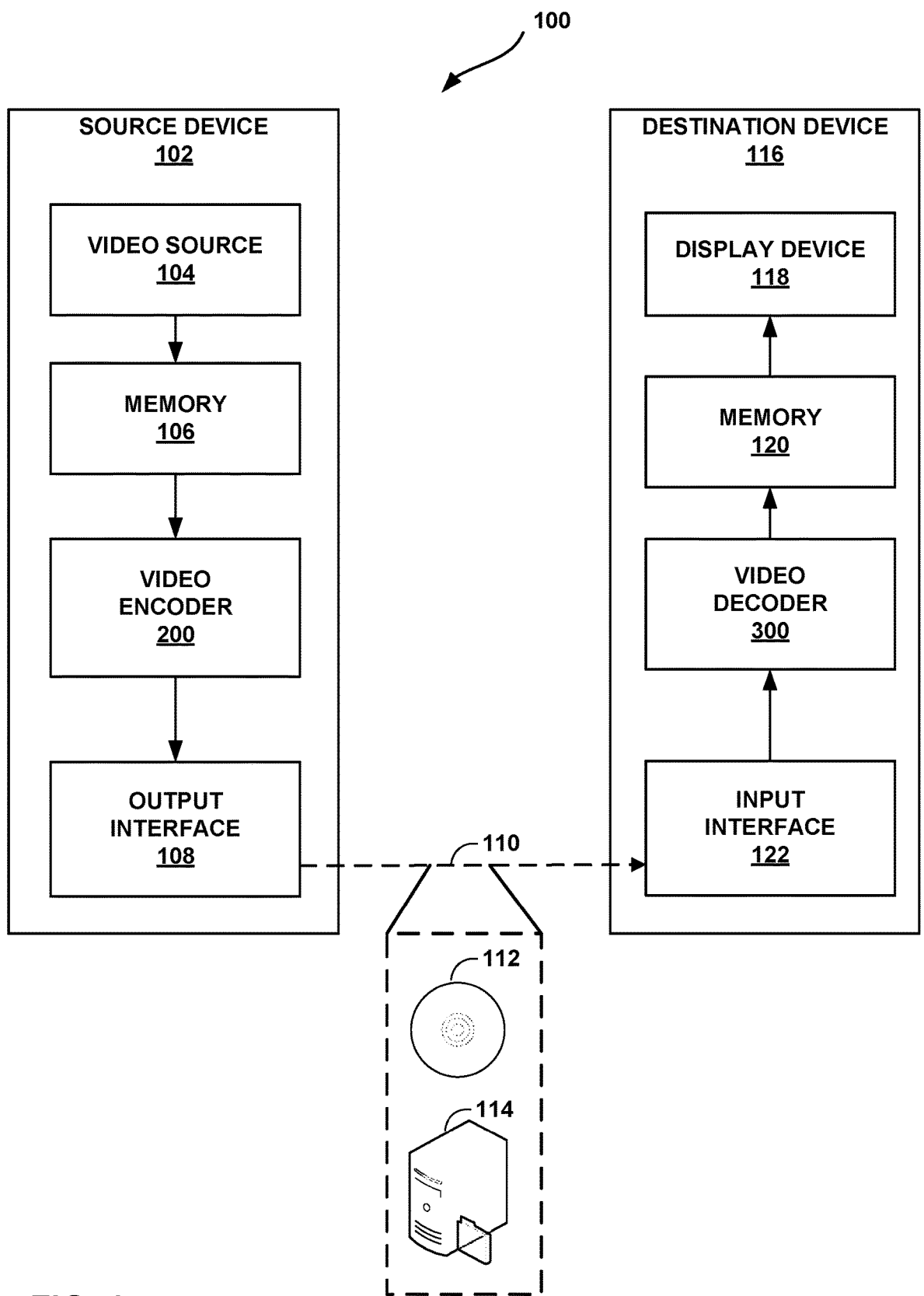
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

To reduce the bits needed to code certain syntax elements, some syntax elements may be coded using context adaptive binary arithmetic coding (CABAC). CABAC uses a context to determine the probability that a next bit will have a certain value. This disclosure describes techniques to improve the accuracy of probability estimation for binary arithmetic coders. The techniques may be used for video encoders and video decoders to calculate and update the probability states for context models associated with CABAC. The techniques of this disclosure may be suitable for the binary arithmetic coders where the probability state represents the real probability in the linear domain, such as CABAC as implemented in Versatile Video Coding (VVC).

Typically, a context state is selected as a function of two state variables, a low rate state variable and a high rate state variable. The low rate state variable and the high rate state variable are updated for a next bin based on a value of a previously coded bin. According to the techniques of this disclosure, the low rate state variable and the high rate state variable may additionally be updated based on the specific combination of the values of the last M bins. With existing techniques, if the previous bin had a certain value, then the low and high rate state variables would always be updated in the same manner. According to the techniques of this invention, however, in two coding scenarios where the previous bin has the same value, the update to the state variables may be different because the last M bins are different, even though the bin to be coded is the same. For example, a video coder may be configured to determine a first shift value based on received bin values and determine a second shift value based on the received bin values. The video coder may then update a first state variable, such as the low rate state variable, based on the first shift value and update a second state variable, such as the high rate state variable, based on the second shift value. The techniques of this disclosure may enable a video coder to select better contexts that enable syntax elements to be signaled with fewer bits, which improves video compression.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding (also called reconstruction) as part of the processes of determining how to encode video data. For example, a video decoder may be configured to determine contexts for CABAC in the same manner as a video encoder, such that both the video encoder and video decoder can use the same context without having to explicitly signal the context.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the disclosed techniques for probability estimation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for probability estimation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use probability estimation as part of a CABAC process.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

CABAC, as implemented in VVC, employs two probability states for each context model. The probability used for CABAC bin encoding and decoding are calculated as the average of the two probability states, as shown below.

$$\text{state}_i = (\text{state}_i[0] + \text{state}_i[1]) >> N, \qquad (1)$$

where state, means the probability state for the $i^{th}$ context model. N is an integer to control the precision of state, and produces the average.

Video encoder 200 and video decoder 300 may be configured to update the two probability states at a low and high rate, respectively, after a bin has been encoded or decoded. In the following examples, $\text{state}_i[0]$ is being updated at a slower rate, and $\text{state}_i[1]$ is being adapted at a higher rate. That is, in one example, the state value for the slower rate state variable takes into consideration more previous bins than the state value of the higher rate state variable, and thus typically changes less as the result of one additional bin. In contrast, the state value for the higher rate state variable takes into consideration fewer previous bins than the state value of the slower rate state variable, and thus typically changes more as the result of one additional bin. In another example, both rates are adapted based on the same amount of the previous bins.

Video encoder 200 and video decoder 300 may be configured to update the probabilities as shown below:
if the bin just being coded is equal to 1:

$$\text{state}_i[0] = \text{state}_i[0] + (((2^{10}-1) - \text{state}_i[0]) >>> \text{shiftL}_i) \qquad (2)$$

$$\text{state}_i[1] = \text{state}_i[1] + (((2^{14}-1) - \text{state}_i[1]) >>> \text{shiftH}_i) \qquad (3)$$

otherwise, if the bin just being coded is equal to 0, $$\text{state}_i[0] = \text{state}_i[0] - (\text{state}_i[0] >>> \text{shiftL}_i) \qquad (4)$$

$$\text{state}_i[1] = \text{state}_i[1] - (\text{state}_i[1] >>> \text{shiftH}_i) \qquad (5)$$

Note that $\text{shiftL}_i$ and $\text{shiftH}_i$ are used to control the adaptation rate for the $i^{th}$ context model. $\text{shiftH}_i$ is greater than or equal to shiftL$_i$, meaning a faster adaptation. The two parameters are pre-defined for each context model and should be stored in ROM.

According to the techniques of this disclosure, video encoder 200 and video decoder 300 may be configured to determine the update and the probability state calculation by providing more dimensions of flexibility. The disclosed techniques include two approaches, which can be used separately or in a combined manner.

In one example, video encoder 200 and video decoder 300 may be configured to determine a weighted average for the probability calculation, instead of doing an even average as in VVC. Such a technique is illustrated below:

$$\text{state}_i = (w_1 \times \text{state}_i[0] + w_2 \times \text{state}_i[1]) >> N, \quad (6)$$

where $w_1$ and $w_2$ are the two weights assigned to the two probability states, respectively.

There are also some variants of this approach, which can be used separately or be combined. In one example, the pair of $(w_1, w_2)$ may pre-defined for each context models. Furthermore, $(w_1, w_2)$ can be different when its context models are used in coding different types of slices, such as I, B, or P Slices. In another example, the pair of $(w_1, w_2)$ may be derived during encoding or decoding process, by certain optimization criterion, such minimum mean square error. In another example, the pair of $(w_1, w_2)$ is normalized, meaning $w_1+w_2$ is equal to 1.0, or can be non-normalized but with restriction, such as $c_0 < w_1+w_2 < c_1$. In another example, generally the pair of $(w_1, w_2)$ is represented by real (floating point) values, but in actual implementations, is converted to integers by scaling. So in probability calculation, proper shifting may be used for normalization.

According to other techniques of this disclosure, video encoder 200 and video decoder 300 may be configured to adapt the slow and fast adaptation rates to local activities (e.g., a certain local sequence of bins as opposed to all bins for a given context), by adjusting shiftL$_i$ and shiftH$_i$. The proposed probability update process is show below:

if the bin just being coded is equal to 1:

$$\text{state}_i[0] = \text{state}_i[0] + (((2^{10}-1) - \text{state}_i[0]) >>> (\text{shift}L_i + \text{delta}L_i)), \quad (7)$$

$$\text{state}_i[1] = \text{state}_i[1] + (((2^{14}-1) - \text{state}_i[1]) >>> (\text{shift}H_i + \text{delta}H_i)), \quad (8)$$

otherwise, if the bin just being coded is equal to 0, $$\text{state}_i[0] = \text{state}_i[0] - (\text{state}_i[0] >>> (\text{shift}L + \text{delta}L_i)) \quad (9)$$

$$\text{state}_i[1] = \text{state}_i[1] - (\text{state}_i[1] >>> (\text{shift}H_i + \text{delta}H_i)), \quad (10)$$

Figure 2:
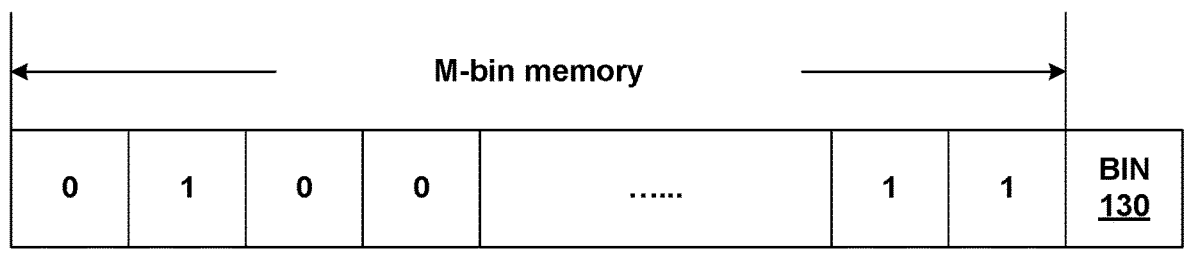
FIG. 2 shows an example of a bin memory that may be used in accordance with the techniques of this disclosure.

In equations (7)-(10), deltaL$_i$ and deltaH$_i$ are integers and can be in ranges, such as −3 to 3, −5 to 5, and −7 to 7. The values of deltaL$_i$ and deltaH$_i$ may adapt to local activities determined by the preceding M bins of the context model. In some implementations, the typical values of M may not exceed 16. As in the example shown in FIG. 2, given a context model, before processing the next bin (bin 130), probability states are update by equations (7) to (10), where deltaL$_i$ and deltaH$_i$ are determined by the preceding M-bin memory.

There are $2^M$ possible combinations of M-bin memory. For example, if M is equal to 10, there are 1024 different M-bin memories, where each one indicates a unique condition (or context) for next bin 130. A $2^M$-entry lookup table is developed for each context model for searching the right deltaL$_i$ and deltaH$_i$, so one can use an integer index of which the binary presentation is the M-bin memory to look up the table and find deltaL$_i$ and deltaH$_i$.

Figure 3:
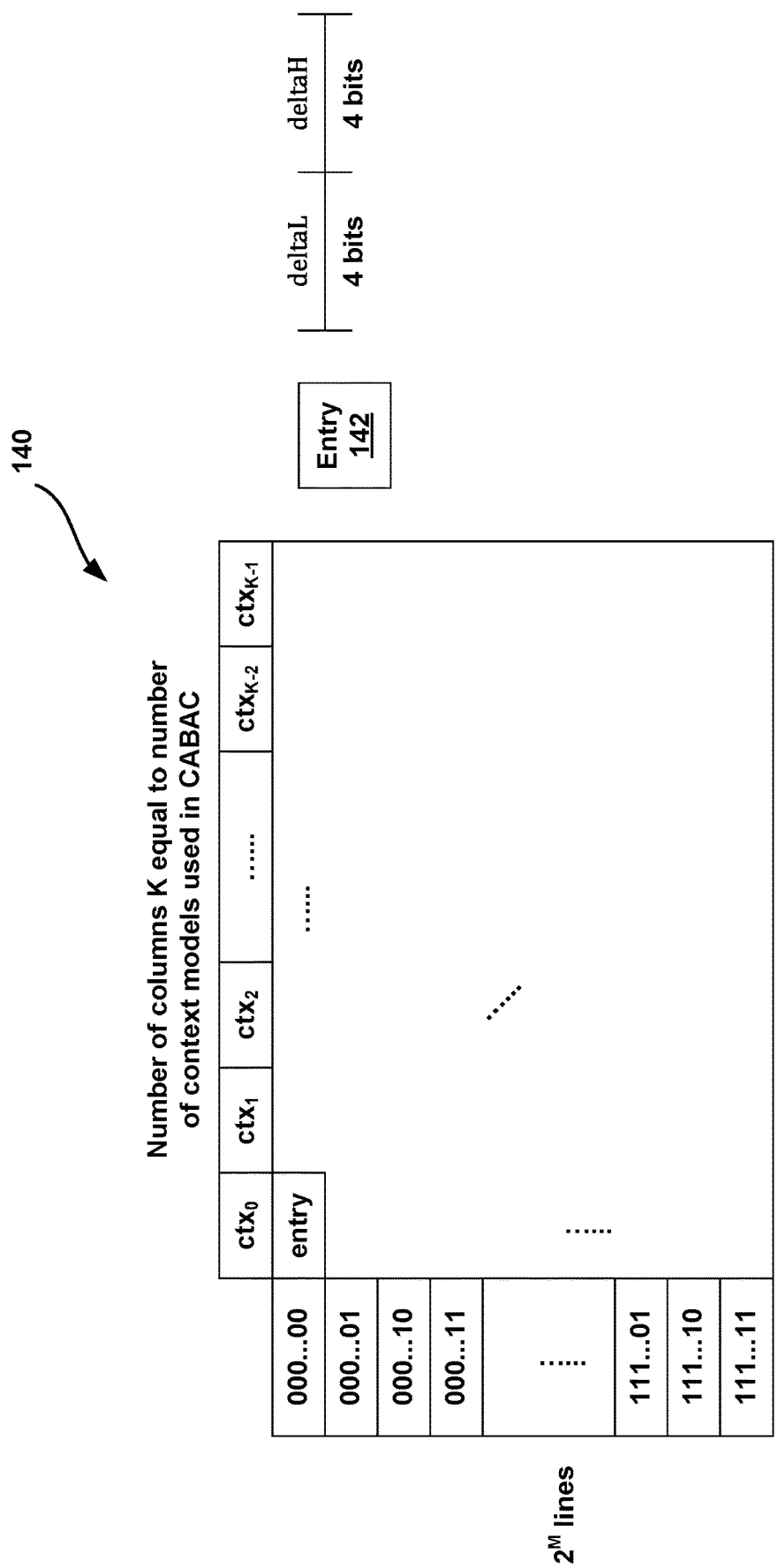
FIG. 3 shows an example of a 2-D look-up table that may be used in accordance with the techniques of this disclosure.

FIG. 3 shows an example of a 2-D look-up table 140 that may be used in accordance with the techniques of this disclosure. Because the $2^M$-entry lookup table is developed for each context model, the look-up table is eventually 2-D, with context model ID and M-bin memory as two indices to search. Thus, video encoder 200 and video decoder 300 may be configured to determine the values of deltaL$_i$ and deltaH$_i$ based on an identifier of the context model and a last M bins. In the example of FIG. 3, the identifiers of the context models (shown as ctx) are on the x-axis, and the 2M M-bin memories are shown on the y-axis. The values of deltaL$_i$ and deltaH$_i$ are packed into byte (8-bit) entry 142, as show in FIG. 3, with deltaL$_i$ and deltaH$_i$ being 4 bits each.

Figure 4:
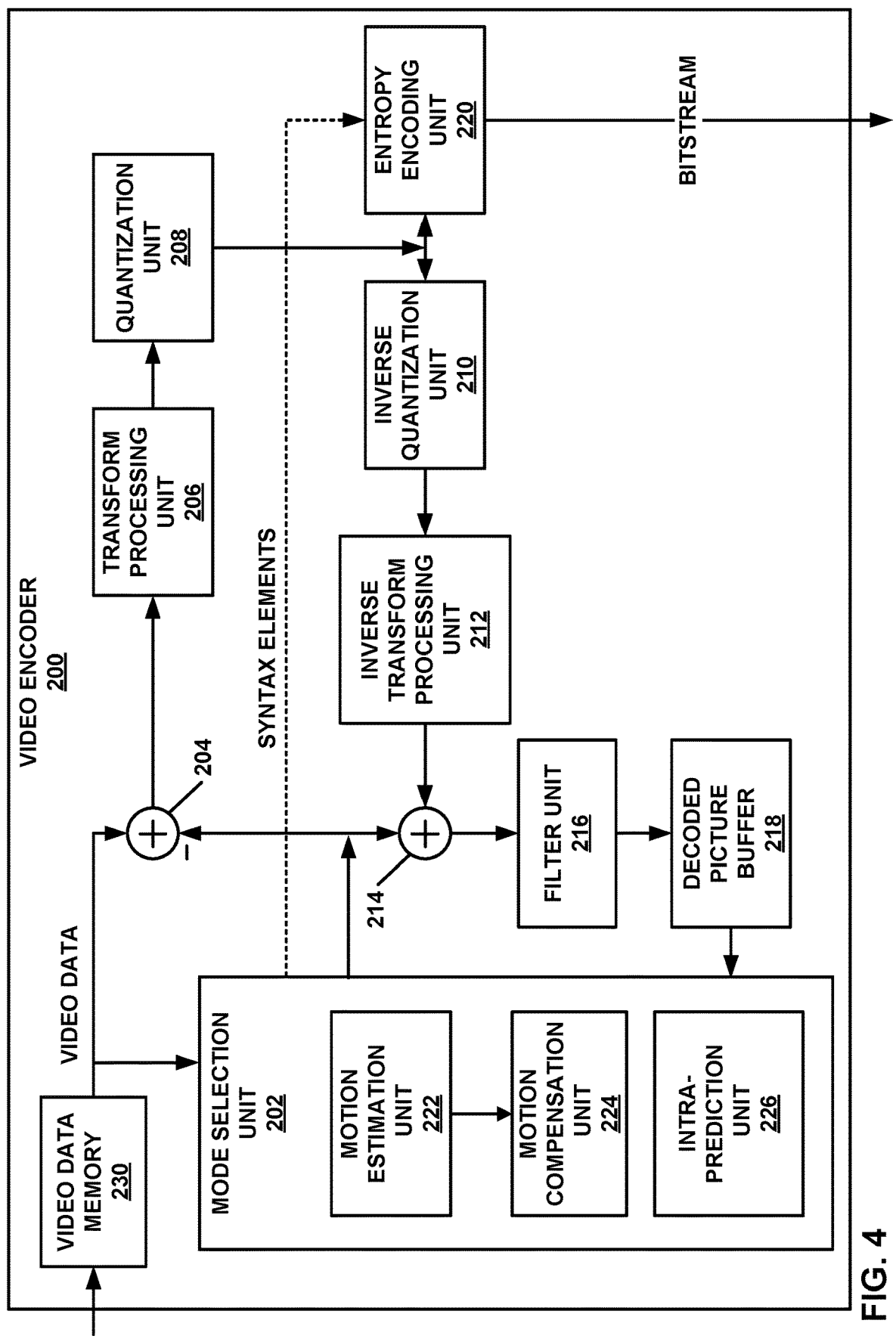
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to calculate a probability of a symbol having a particular value in accordance with any technique described in this disclosure and binary arithmetic code the symbol according to the probability of the symbol having the particular value.

Figure 5:
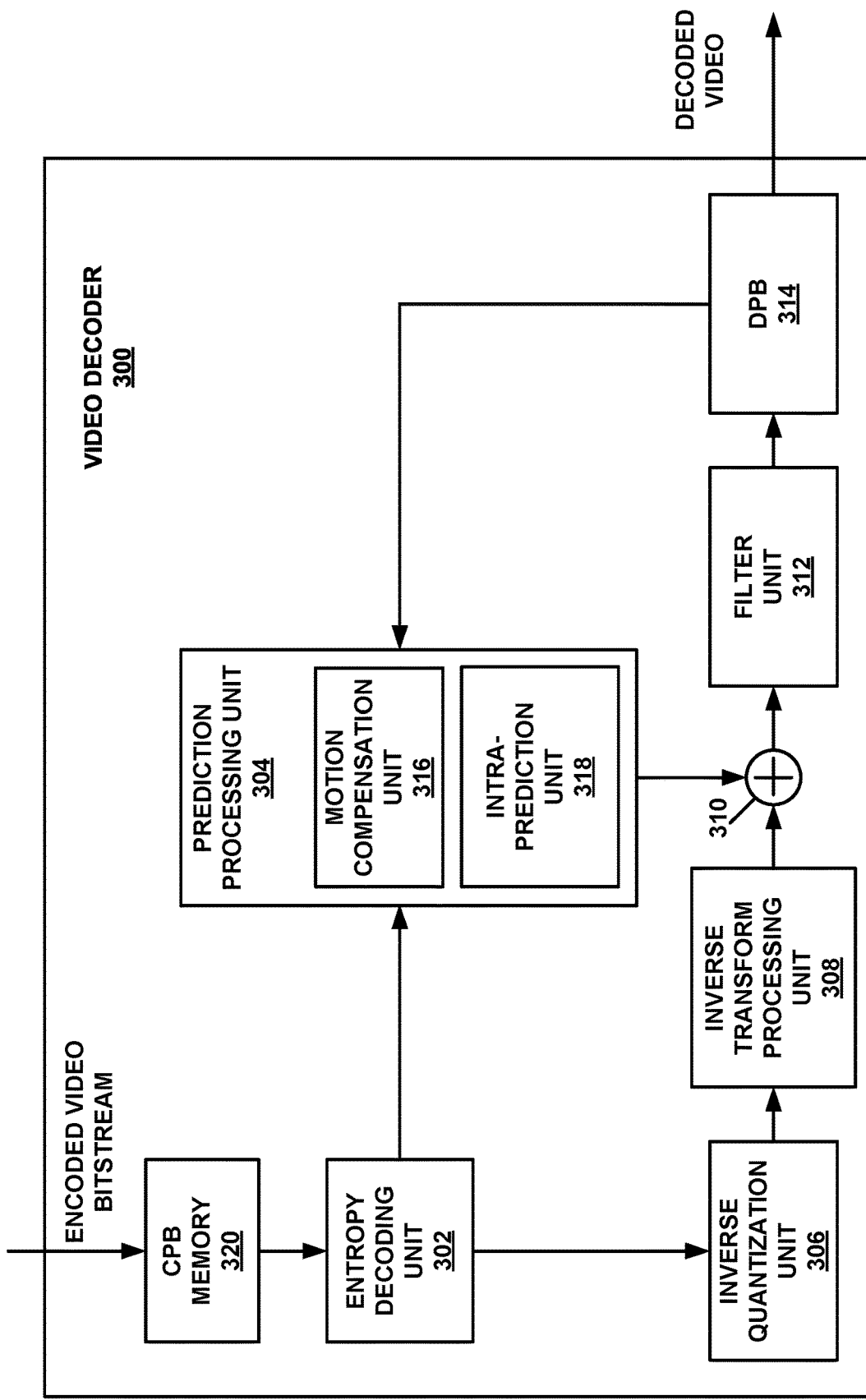
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to calculate a probability of a symbol having a particular value in accordance with any technique described in this disclosure and binary arithmetic code the symbol according to the probability of the symbol having the particular value.

Figure 6:
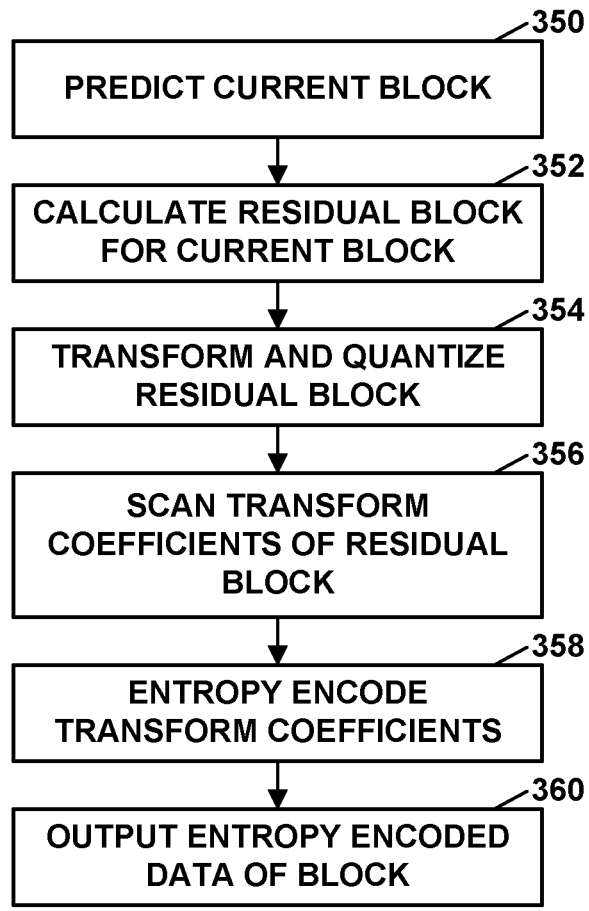
FIG. 6 is a flowchart illustrating an example process for encoding a current block in accordance with the techniques of this disclosure.

FIG. 6 is a flowchart illustrating an example process for encoding a current block in accordance with the techniques of this disclosure. The current block may comprise a current CU. Although described with respect to video encoder 200 (FIGS. 1 and 4), it should be understood that other devices may be configured to perform a process similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 7:
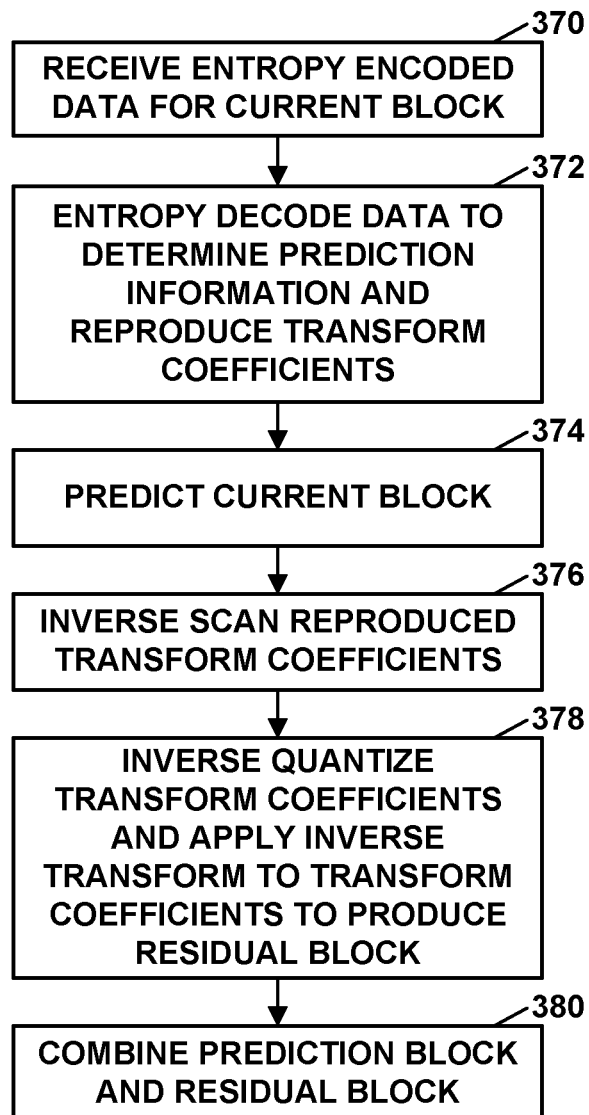
FIG. 7 is a flowchart illustrating an example process for decoding a current block in accordance with the techniques of this disclosure.

FIG. 7 is a flowchart illustrating an example process for decoding a current block of video data in accordance with the techniques of this disclosure. The current block may comprise a current CU. Although described with respect to video decoder 300 (FIGS. 1 and 5), it should be understood that other devices may be configured to perform a process similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 8A:
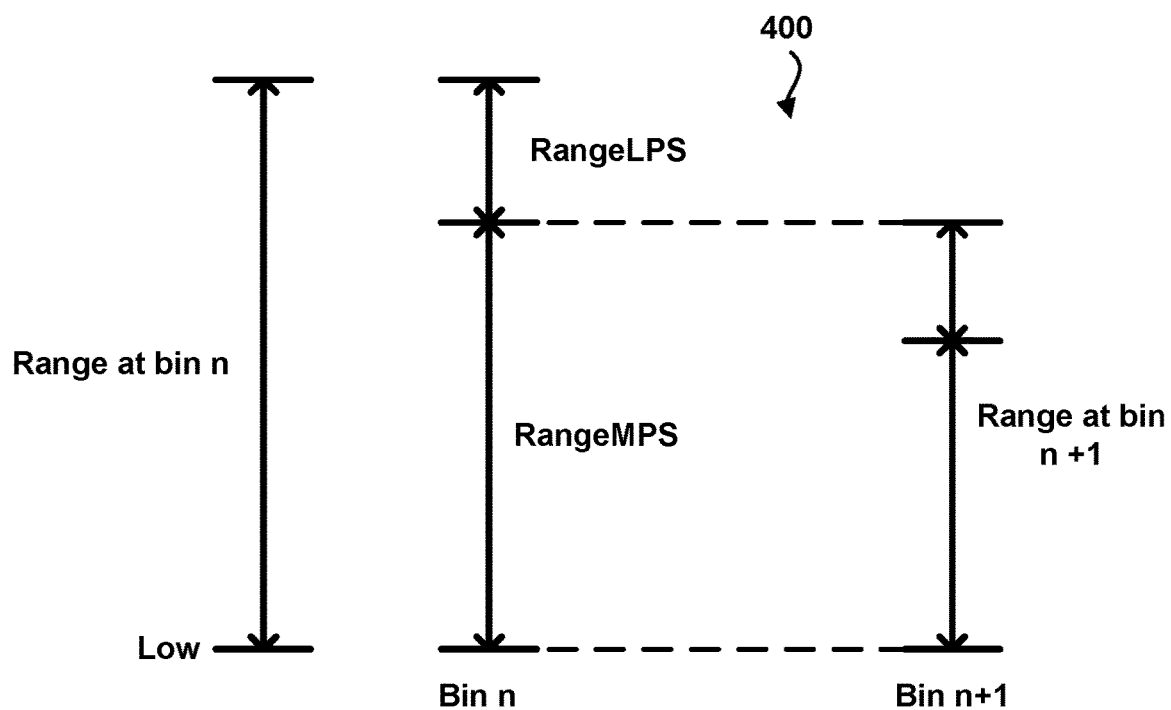
FIGS. 8A and 8B are conceptual diagrams illustrating a range update process in binary arithmetic coding.
Figure 8B:
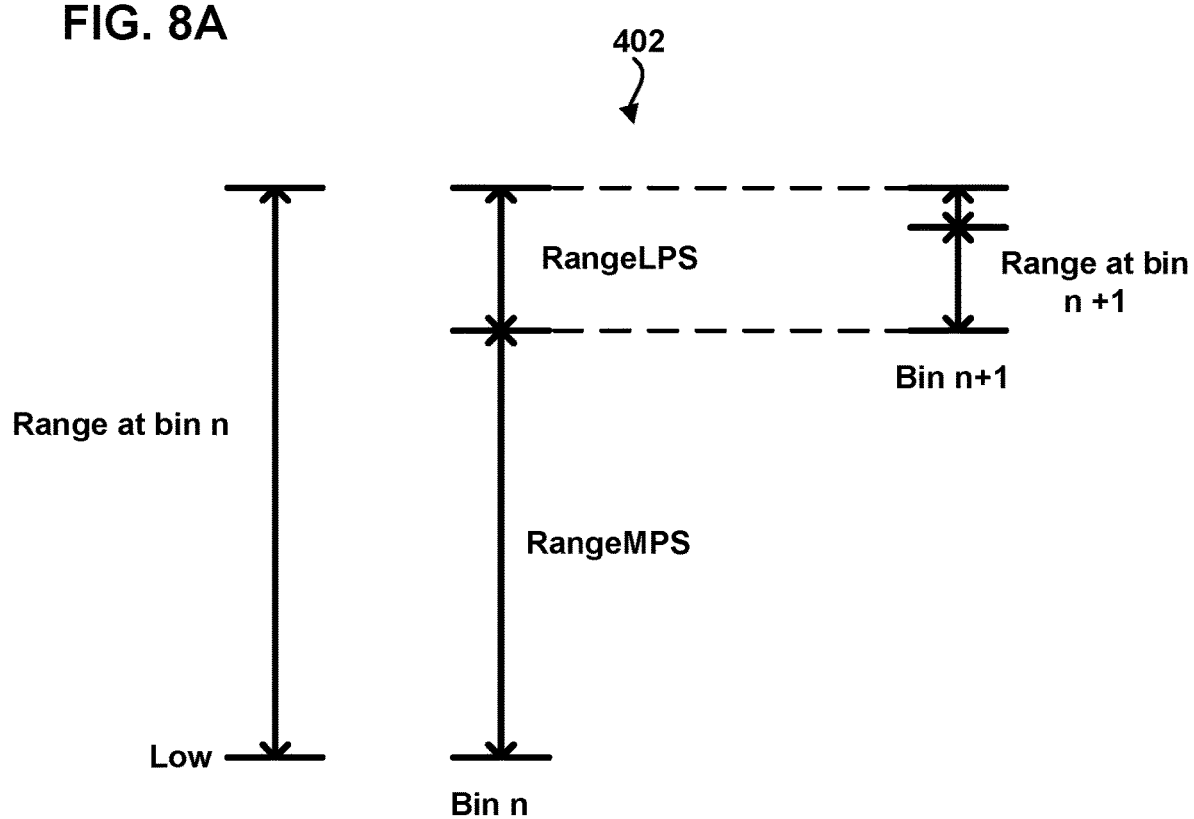

FIGS. 8A and 8B show examples of a CABAC process at a bin n. In example 400 of FIG. 8A, at bin n the range at bin 2 includes the RangeMPS and RangeLPS given by the probability of the least probable symbol (LPS) ($p_\sigma$) given a certain context state ($\sigma$). Example 400 shows the update of the range at bin n+1 when the value of bin n is equal to the most probable symbol (MPS). In this example, the low stays the same, but the value of the range at bin n+1 is reduced to the value of RangeMPS at bin n. Example 402 of FIG. 8B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 9:
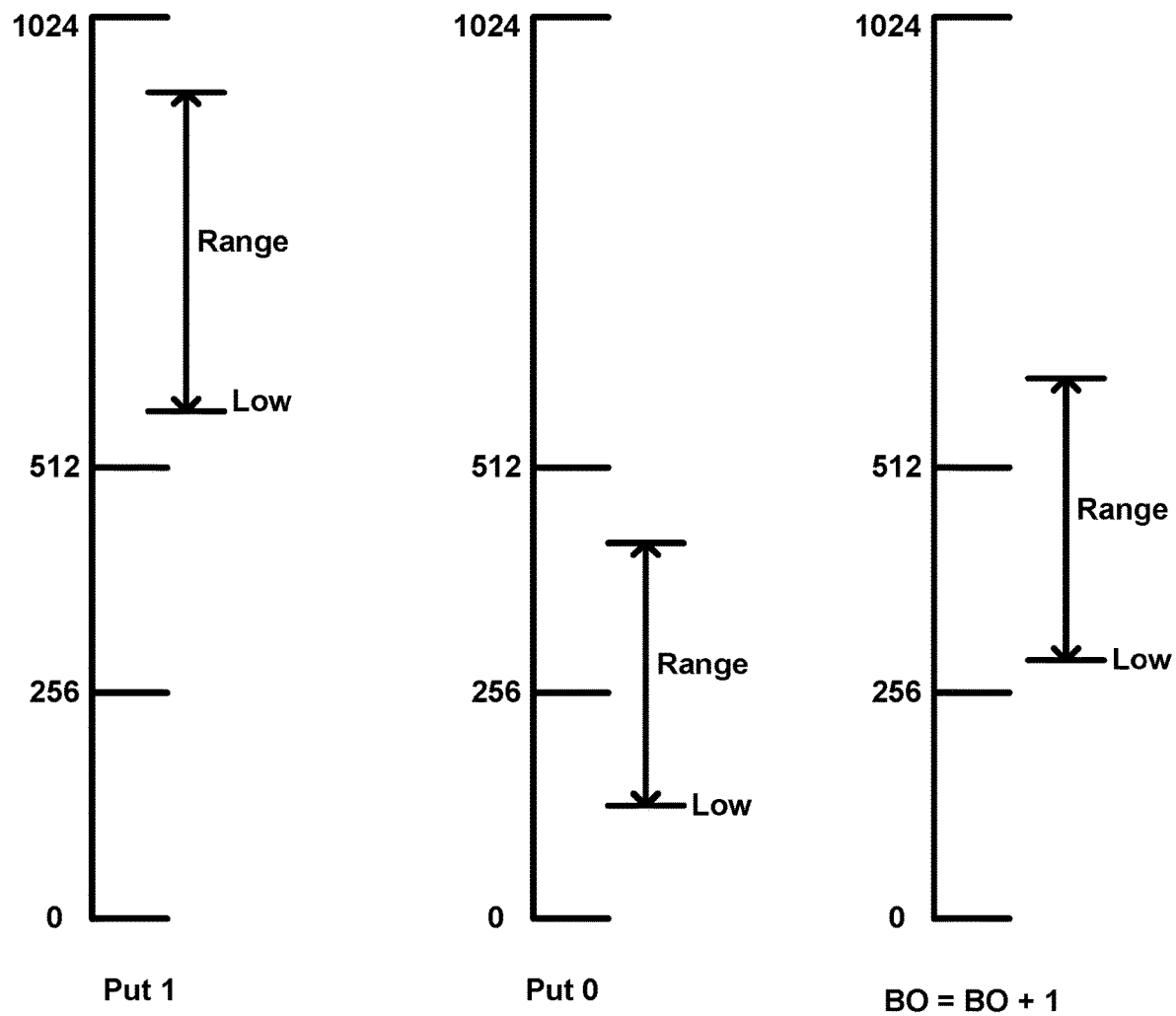
FIG. 9 is a conceptual diagram illustrating an output process in binary arithmetic coding.

In one example of the HEVC video coding process, range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the binary arithmetic coder (BAC) outputs to the bitstream, a '0,' or a '1,' or updates an internal variable (called BO: bits-outstanding) to keep for future outputs. FIG. 9 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some examples of HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

To reduce the computation of deriving LPS ranges (rangeLPS$_\sigma$), results for all cases may be pre-calculated and stored as approximations in a look-up table. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| Range Index | | | | |
|---|---|---|---|---|
| Range | 256-319 | 320-383 | 384-447 | 448-511 |
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2
RangeLPS

| Prob State ($\sigma$) | RangeLPS | | | |
|---|---|---|---|---|
| | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state, is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability p for each state is derived as follows:

$$p_\sigma = \alpha p_{\sigma-1}$$

where the state σ is from 0 to 63. The constant α represents the amount of probability change between each context state. In one example, α=0.9493, or, more precisely, α=(0.01875/0.5)$^{1/63}$. The probability at state σ=0 is equal to 0.5 (i.e., $p_0$=½). That is, at context state 0, the LPS and MPS are equally probable. The probability at each successive state is derived by multiplying the previous state by a. As such, the probability of the LPS occurring at context state α=1 is $p_0$*0.9493 (0.5*0.9493=0.47465). As such, as the index of state α increases, the probability of the LPS occurring goes down.

CABAC is adaptive because the probability states are updated in order to follow the signal statistics (i.e., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index may be incremented by 1. This is for all states except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index σ=0, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability poly and its updated counterpart $p_{new}$:

$$p_{new} = \max(\alpha p_{old}, p_{62}) \text{ if a MPS occurs}$$

$$p_{new} = (1-\alpha) + \alpha p_{old} \text{ if a LPS occurs}$$

With regard to a practical implementation of the probability estimation process in CABAC, it is important to note that all transition rules may be realized by at most two tables each having 63 entries of 6-bit unsigned integer values. In some examples, state transitions may be determined with a single table TransIdxLPS, which determines, for a given state index σ, the new updated state index TransIdxLPS [σ] in case an LPS has been observed. The MPS-driven transitions can be obtained by a simple (saturated) increment of the state index by the fixed value of 1, resulting in an updated state index min(σ+1, 62). Table 3 below is an example of a partial TransIdxLPS table.

TABLE 3

| TransIdxLPS | |
|---|---|
| Prob State (σ) | New State TransIdxLPS [σ] |
| ... | ... |
| 9 | 6 |
| 10 | 8 |
| 11 | 8 |
| 12 | 8 |
| ... | ... |

One problem with previous BAC approaches (e.g., the BAC approach used in H.264/AVC), is that the tables RangeLPS and TransIdxLPS are tuned for low resolution videos, (i.e., common intermediate format (CIF) and quarter-CIF (QCIF) videos). Currently, a large amount of video content is high definition (HD) and, in some cases, greater than HD. Video content that is HD or greater than HD resolution has different statistics than the 10-year-old QCIF sequences used to develop H.264/AVC.

As such, tables RangeLPS and TransIdxLPS from H.264/AVC may cause adaptation between states in a manner that is too quick. That is, the transitions between probability states, especially when an LPS occurs, can be too great for the smoother, higher resolution content of HD video. Thus, the probability models used according to conventional techniques are not as accurate for HD and extra-HD content. In addition, as HD video content includes a greater range of pixel values, the H.264/AVC tables do not include enough entries to account for the more extreme values that may be present in HD content.

As such, there is a need for the RangeLPS and TransIdxLPS tables to be modified to account for the characteristics of this new content. This also implies that BAC should be different in at least two aspects. One difference is that BAC processes should use tables that allow for a slower adaptation process. Another difference is that BAC processes should account for more extreme cases (i.e., skewed probabilities).

The current RangeLPS and TransIdxLPS tables can be modified to achieve these goals by simply including more probability states and ranges. However, this solution incurs a substantial increase in the sizes of the tables. Slower adaptation may be achieved by using a parameter α closer to 1 than the currently used parameter α (e.g., α=0.9493). However, using a larger value of a causes the probabilities to tend to 0 more slowly, and as such, more states are needed. In addition, to achieve slower adaptation, it may be beneficial if the lowest possible probability is much lower than the currently used lowest probability. As such, even more states may be needed to reach that very low probability value.

In view of the foregoing problems, this disclosure proposes techniques to modify BAC so as to attain slower adaptation and more skewed probabilities while keeping the table sizes (e.g., the RangeLPS and TransIdxLPS tables) at a practical level. In other words, this disclosure describes techniques to achieve slower adaptation and more extreme probabilities (i.e., probabilities closer to 0 and 1) while using relatively small-sized tables.

The techniques described in this disclosure may use more probability states, e.g., more probability states than used in BAC with H.264/AVC or HEVC. In this case, the TransIdxLPS table can obtain slower adaptation and lower probabilities. In one example, the techniques described in this disclosure may use 128 probability states instead of 64. This increases the table TransIdxLPS by 64 entries (i.e., 128 entries instead of 64). This increase allows for slower adaptation and lower minimal probability. As one example, by setting the parameter $\alpha=0.9689$, the differences between contiguous probabilities become smaller. Additionally, the lowest minimum probability goes down to 0.009, which is around one-half of the H.264/AVC case (i.e., 0.01875). Other numbers of states and $\alpha$ values are also possible, though, in general, the number of states may be increased and the value of $\alpha$ may be closer to 1 than the H.264/AVC case of $\alpha=0.9493$.

Another parameter that might be modified to improve HD or extra-HD coding is the parameter $p_0$. The value of $p_0$ generally indicates the maximum probability for the LPS. The reason to consider this possibility is that having a lower $p_0$ means that the minimal probability also decreases. The value of $p_0$ is set to 0.5 in the conventional BAC process. This disclosure proposes to allow for other values for $p_0$. Having other values of $p_0$ lower than 0.5 allows for smoother transitions at state 0 when the MPS/LPS swap occurs. In one example, $p_0$ may be equal to 0.493, although many other examples could also be used.

Usually, each probability state has its own entry in the RangeLPS table. The table size may be represented as:

probability states×#quantized range indexes which is 64×4=256 bytes in some proposals for HEVC. Since the number of states would increase in examples of this disclosure (doubled in the example above), the RangeLPS table size may be 128×4=512 bytes. To avoid this increase in the RangeLPS table size, however, this disclosure further proposes to map the probability states indexes to a lower size (i.e., a few number of indexes) to index the RangeLPS size. In other words, this disclosure proposes to decouple the state transition process from the range computation process. This means, in the current example, that there is a map for the states to range computation. Video encoder 200 and/or video decoder 300 may be configured to map an index indicating the determined probability state to one of a plurality of grouped indexes (e.g., grouped index for a RangeLPS table), with at least one of the grouped indexes representing at least two of the plurality of probability states. As such, the RangeLPS table (or other BAC tables) may use fewer indexes than there are probability states.

In one example of the disclosure, the probability state number may be divided by two to generate a new index to use as an entry for the RangeLPS table. In this case, the 128 probability states are reduced to 64 entries. Consequently, the RangeLPS table can keep the current size as used in H.264/AVC. Therefore, instead of using the probability state $\sigma$ to index the entry in the range LPS table, the techniques described in this disclosure employ ($\sigma$>>1), that is, the state $\sigma$ is divided by two and rounded to the lower integer for use as a grouped index into the RangeLPS table. The division can be by a larger number if the RangeLPS table is desired to be smaller for a given implementation, or if the number of states is larger (e.g., 256 probability states). In this context, each grouped index represents two probability states. In other examples of the disclosure, the grouped indexes may represent two or more probability states.

From an optimal entropy point of view, the grouping of the states for the RangeLPS table by using the division or right bit-shift operation may be beneficial, but may not always be the optimal technique. The optimal grouping may depend on several factors, including the number of states and the parameter $\alpha$, among others. The most desirable (and possibly optimal) grouping might not be a straightforward operation like the bit-shift operation. In general, the grouping can be described with a table, going from the total number of probability states to a reduced number of probability states (i.e., grouped states). In another example, this disclosure proposes to use this kind of table. This approach would enhance performance (compared to the division or right shifting), at the cost of additional memory. As such, this example is a trade-off between memory and performance, favoring better performance over the linear mapping example (i.e., the division or right shifting).

Hence, although a linear mapping of probability states to entries in the RangeLPS table may be used, it may be desirable to provide a nonlinear mapping. For example, the probability states may be mapped according to a logarithmic mapping. A logarithmic mapping may be achieved, in some examples, using piecewise linear mapping techniques. In general, such a mapping may be defined using a table, such as a precomputed mapping table.

In general, the techniques described in this disclosure may be performed, in some examples, by a process or device for entropy coding video data. The process may include determining a probability state of symbols in a binary arithmetic coding process, where the probability state may be one of a plurality of probability states, and mapping an index indicating the determined probability state to one of a plurality of grouped indexes, where at least one of the grouped indexes represents at least two of the plurality of probability states, and where each of the grouped indexes points to a range for a lowest probability symbol in a table.

In some examples, the number of probability states may be greater than 64. For example, the number of probability states may be 128. In some examples, the number of grouped indexes used as an input into the RangeLPS table is 64. In particular, the number of probability states may be 128 and the number of grouped indexes used as an input into the RangeLPS table may be 64. A symbol may be coded based on the grouped indexes, e.g., according to a table based on the probability state index, or according to a mathematical operation based on the index. The determined probability state maps to one of a plurality of indexes according to a table, or according to a mathematical operation. The mapping may be linear or nonlinear. For example, the mapping may be performed according to a divide-by-two operation. In some examples, the mapping may be a logarithmic mapping. In some examples, a piecewise linear mapping may be used to define a logarithmic mapping. In some examples, the value $p_0$ of the maximum probability for the LPS may be less than 0.5.

The techniques described in this disclosure may be performed, for example, within a video encoder, video decoder, or combined video encoder-decoder (CODEC). In particular, such techniques may be performed in an entropy encoding unit of a video encoder and/or an entropy decoding unit of a video decoder. The techniques may be performed, for example, within a CABAC process, which may be configured to support video coding, such as video coding according to aspects of the HEVC standard Entropy encoding and decoding units may apply coding processes in a reciprocal or inverse manner, e.g., to encode or decode any of a variety of video data, such as quantized transform coefficients associated with residual video data, motion vector information, syntax elements, and other types of information that may be useful in a video encoding and/or video decoding process.

Figure 10:
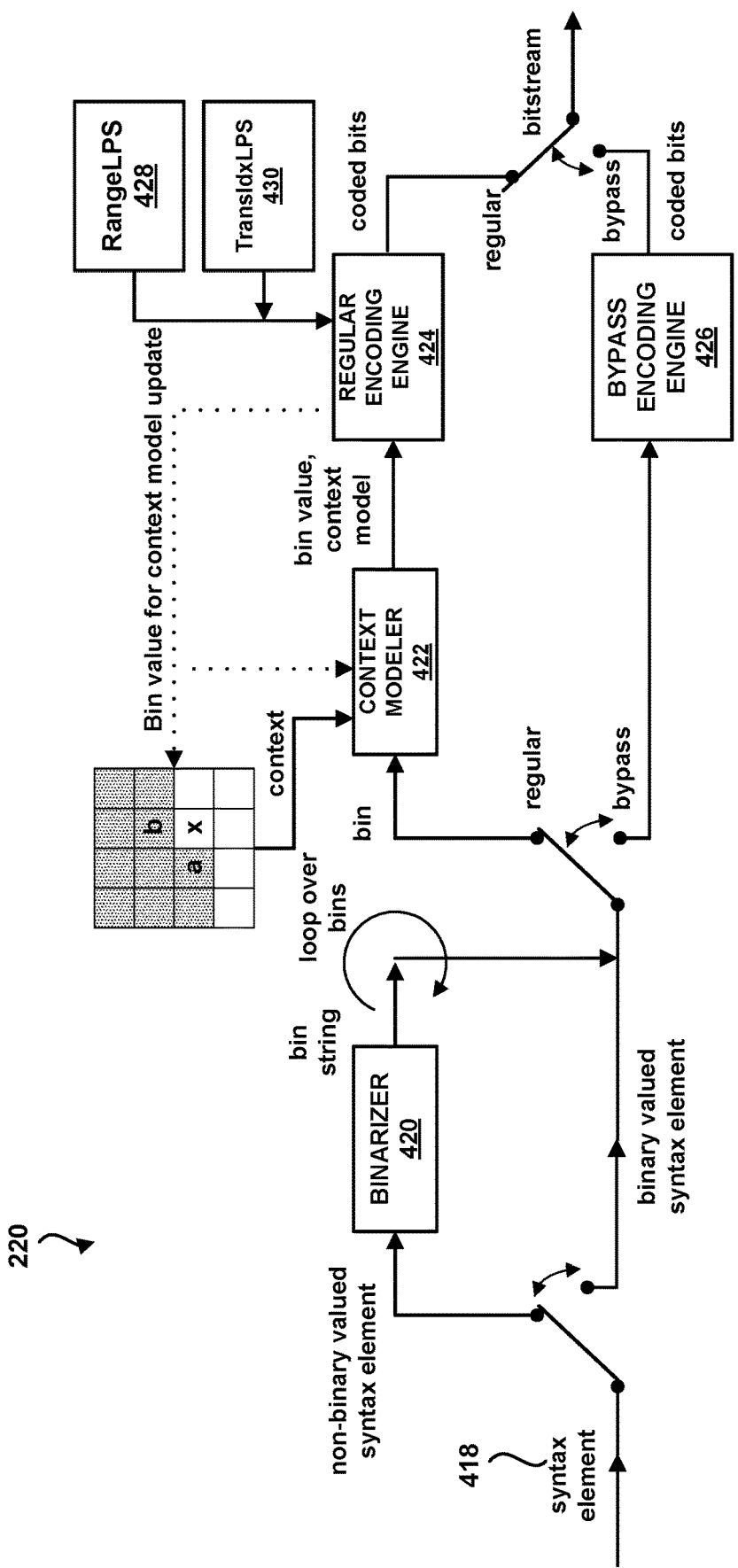
FIG. 10 is a block diagram illustrating a context adaptive binary arithmetic coding (CABAC) coder in a video encoder.

FIG. 10 is a block diagram of an example implementation of entropy encoding unit 220 in FIG. 4. Entropy encoding unit 220 may be configured to perform CABAC in accordance with the techniques of this disclosure. A syntax element 418 is input into the entropy encoding unit 220. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 420. Binarizer 420 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 420 is fed to the binary arithmetic coding side of entropy encoding unit 56. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 426 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 422. Context modeler 422 outputs the bin value and the context model (e.g., the probability state σ). The context model may be an initial context model for a series of bins, or may be determined based on the coded values of previously coded bins. As described above, the context modeler may update the state based on whether or not the previously-coded bin was an MPS or an LPS.

After the context model and probability state σ are determined by context modeler 422, regular coding engine 424 performs BAC on the bin value. According to the techniques of this disclosure, regular coding engine 424 performs BAC using TransIdxLPS table 430 that includes more than 64 probability states σ. In one example, the number of probability states is 428. TransIdxLPS is used to determine which probability state is used for a next bin (bin n+1) when the previous bin (bin n) is an LPS. Regular coding engine 424 may also use a RangeLPS table 428 to determine the range value for an LPS given a particular probability state σ. However, according to the techniques of this disclosure, rather than using all possible probability states σ of the TransIdxLPS table 430, the probability state indexes σ are mapped to grouped indexes for use in the RangeLPS table. That is, each index into the RangeLPS table 428 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

In accordance with one or more techniques of this disclosure, as opposed to using the same value of a variable used to update a probability state in a binary arithmetic coding process (e.g., one or more of a window size, a scaling factor (α), and a probability updating speed), entropy encoding unit 56 may use different values of the variable for different context models and/or different syntax elements. For instance, entropy encoding unit 56 may determine, for a context model of a plurality of context models, a value of a variable used to update a probability state in a binary arithmetic coding process, and update the probability state based on the determined value.

Figure 11:
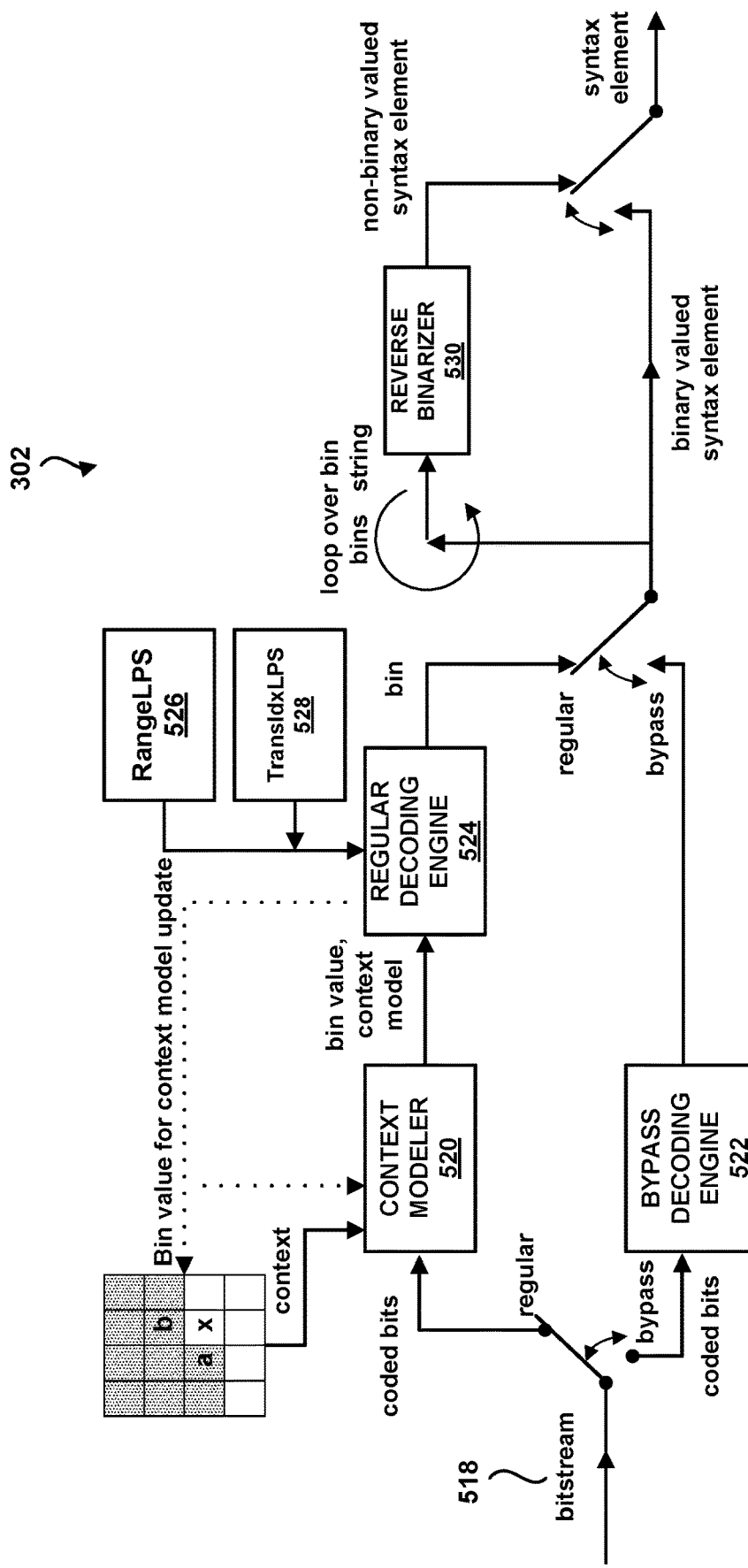
FIG. 11 is a block diagram illustrating a CABAC coder in a video decoder.

FIG. 11 is a block diagram of an example entropy decoding unit 302 that may be configured to perform CABAC in accordance with the techniques of this disclosure. The entropy decoding unit 302 of FIG. 11 performs CABAC in an inverse manner as that of entropy encoding unit 220 described in FIG. 4. Coded bits from bitstream 518 are input into entropy decoding unit 302. The coded bits are fed to either context modeler 520 or bypass decoding engine 522 based on whether or not the coded bits were entropy coded using bypass mode or regular mode. If the coded bits were coded in bypass mode, bypass decoding engine 522 may, for example, use Golomb-Rice or exponential Golomb decoding to retrieve the binary-valued syntax elements or bins of non-binary syntax elements.

If the coded bits were coded in regular mode, context modeler 520 may determine a probability model for the coded bits and regular decoding engine 524 may decode the coded bits to produce bins of non-binary valued syntax elements (or the syntax elements themselves if binary-valued). After the context model and probability state σ is determined by context modeler 520, regular decoding engine 524 performs BAC on the bin value. According to the techniques of this disclosure, regular decoding engine 524 performs BAC using TransIdxLPS table 528 that includes more than 64 probability states σ. In one example, the number of probability states is 128, although other numbers of probability states could be defined, consistent with the techniques of this disclosure. TransIdxLPS table 528 is used to determine which probability state is used for a next bin (bin n+1) when the previous bin (bin n) is an LPS. Regular decoding engine 524 may also use a RangeLPS table 526 to determine the range value for an LPS given a particular probability state σ. However, according to the techniques of this disclosure, rather than using all possible probability states σ of the TransIdxLPS table 528, the probability state indexes σ are mapped to grouped indexes for use in RangeLPS table 526. That is, each index into RangeLPS table 526 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_O$) of an LPS occurring may be set to be lower than 0.5. In one example, $p_O$ may be equal to 0.493.

After the bins are decoded by regular decoding engine 524, a reverse binarizer 530 may perform a reverse mapping to convert the bins back into the values of the non-binary valued syntax elements.

Figure 12:
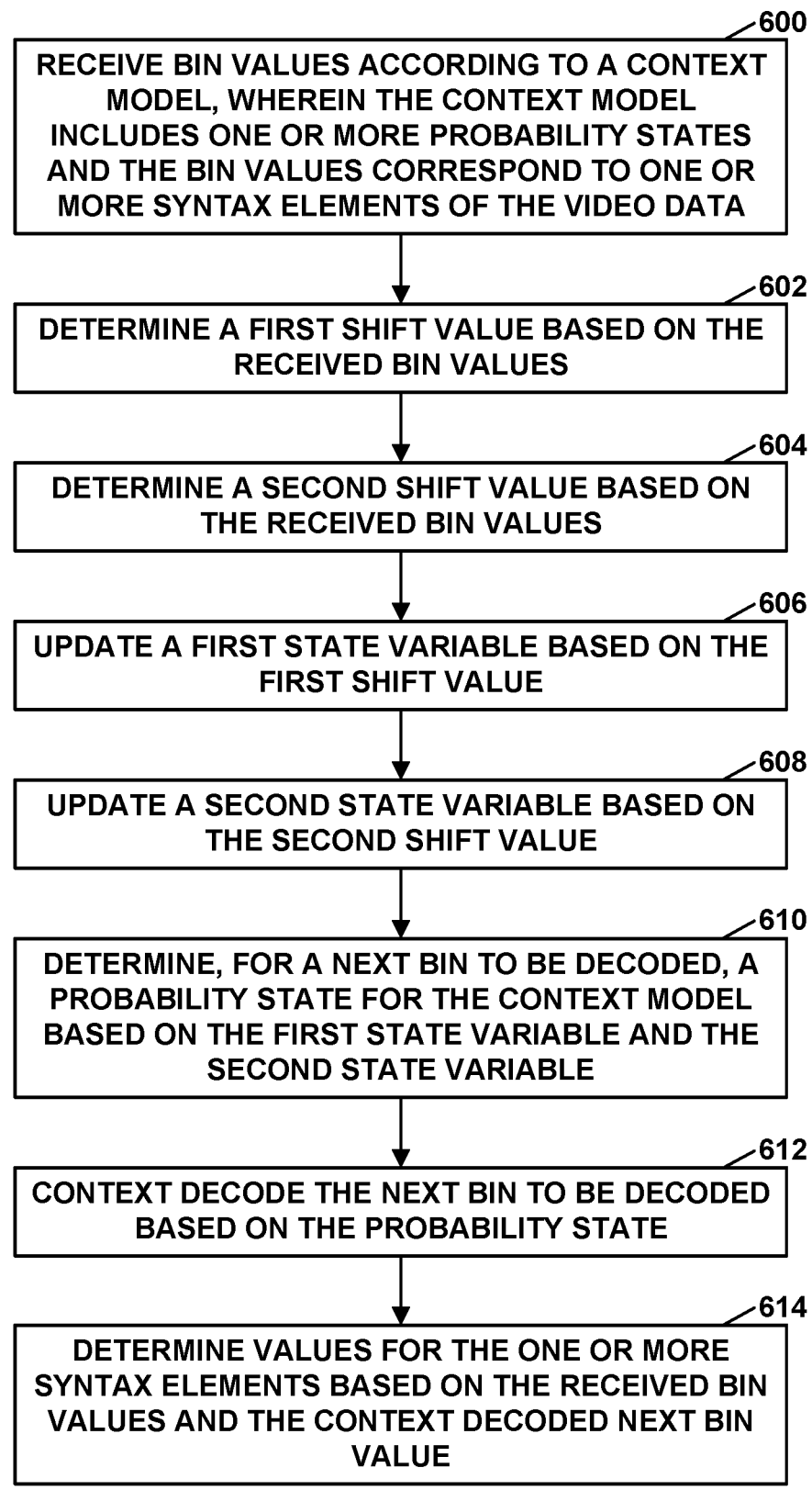
FIG. 12 is a flowchart illustrating an example process for decoding a current block in accordance with the techniques of this disclosure.

FIG. 12 is a flowchart illustrating an example process for decoding a bitstream of video data. Although described with respect to video decoder 300 (FIGS. 1 and 5), it should be understood that other devices may be configured to perform a process similar to that of FIG. 12.

Video decoder 300 may be configured to receive bin values according to a context model (600). The context model includes one or more probability states, and the bin values correspond to one or more syntax elements of the video data.

Video decoder 300 determines a first shift value based on the received bin values (602). Video decoder 300 determines a second shift value based on the received bin values (604). To determine the first shift value based on the received bin values, video decoder 300 may be configured to identify an entry in a look up table based on an identifier of the context model and a last M bin values received, with M being an integer value greater than 1, and video decoder 300 may determine the first shift value based on the entry. Video decoder 300 may also determine the second shift value based on the entry. The entry may, for example, be an 8-bit value, where the first 4 bits of the 8-bit value identify the first shift value and the last 4 bits of the 8-bit value identify the second shift value. The first shift value may be updated at a higher rate than the second shift value. That is the first shift value may update faster than the second shift value.

Video decoder 300 updates a first state variable based on the first shift value (606). Video decoder 300 updates a second state variable based on the second shift value (608). To determine the probability state for the context model based on the first state variable and the second state variable, video decoder 300 may be configured to determine the probability state based on a weighted average of the first state variable and the second state variable. Video decoder 300 may determine weights for calculating the weighted average of the first state variable and the second state variable based on the context model. As described above, the weights may include a first weight and a second weight, and a sum of the first weight and the second weight is equal to 1. Video decoder 300 may be configured to determine values for the weights based on an identifier of the context model.

Video decoder 300 determines, for a next bin to be decoded, a probability state for the context model based on the first state variable and the second state variable (610). Video decoder 300 context decodes the next bin to be decoded based on the probability state (612).

Video decoder 300 determines values for the one or more syntax elements based on the received bin values and the context decoded next bin value (614). Video decoder 300 may use the syntax elements to decode blocks of video data, and the blocks of video data may be output as part of decoded pictures. The techniques of this disclosure are not limited to any particular type of syntax elements, but may be of particular benefit for frequently occurring syntax elements, such as the syntax elements used to code transform coefficients.

The following numbered clauses illustrate one or more aspects of the devices and techniques described in this disclosure.

Clause 1A: A method of coding data, the method comprising: calculating a probability of a symbol having a particular value in accordance with any technique described in this disclosure; and binary arithmetic coding the symbol according to the probability of the symbol having the particular value.

Clause 2A: The method of clause 1A, wherein coding comprises decoding.

Clause 3A: The method of clause 1A, wherein coding comprises encoding.

Clause 4A: A device for coding video data, the device comprising one or more means for performing the method of any of clauses 1A-3A.

Clause 5A: The device of clause 4A, wherein the one or more means comprise one or more processors implemented in circuitry.

Clause 6A: The device of any of clauses 4A and 5A, further comprising a memory to store the video data.

Clause 7A: The device of any of clauses 4A-6A, further comprising a display configured to display decoded video data.

Clause 8A: The device of any of clauses 4A-7A, wherein the device comprises one or more of a camera, a computer, a mobile device, a broadcast receiver device, or a set-top box.

Clause 9A: The device of any of clauses 4A-8A, wherein the device comprises a video decoder.

Clause 10A: The device of any of clauses 4A-9A, wherein the device comprises a video encoder.

Clause 11A: A computer-readable storage medium having stored thereon instructions that, when executed, cause one or more processors to perform the method of any of clauses 1A-3A.

Clause 12A: A device for encoding video data, the device comprising: means for calculating a probability of a symbol having a particular value in accordance with any technique described in this disclosure; and means for binary arithmetic coding the symbol according to the probability of the symbol having the particular value.

Clause 1B: A method of decoding video data, the method comprising: receiving bin values according to a context model, wherein the context model includes one or more probability states and the bin values correspond to one or more syntax elements of the video data; determining a first shift value based on the received bin values; determining a second shift value based on the received bin values; updating a first state variable based on the first shift value; updating a second state variable based on the second shift value; determining, for a next bin to be decoded, a probability state for the context model based on the first state variable and the second state variable; context decoding the next bin to be decoded based on the probability state; and determining values for the one or more syntax elements based on the received bin values and the context decoded next bin value.

Clause 2B: The method of clause 1B, wherein determining the probability state for the context model based on the first state variable and the second state variable comprises determining the probability state based on a weighted average of the first state variable and the second state variable.

Clause 3B: The method of clause 2B, further comprising: determining weights for calculating the weighted average of the first state variable and the second state variable based on the context model.

Clause 4B: The method of clause 3B, wherein the weights comprise a first weight and a second weight and a sum of the first weight and the second weight is equal to 1.

Clause 5B: The method of clause 3B or 4B, further comprising: determining values for the weights based on an identifier of the context model.

Clause 6B: The method of any of clauses 1B-5B, wherein determining the first shift value based on the received bin values comprises: identifying an entry in a look up table based on an identifier of the context model and a last M bin values received, wherein M is an integer value greater than 1; determining the first shift value based on the entry.

Clause 7B: The method of clause 6B, further comprising: determining the second shift value based on the entry.

Clause 8B: The method of clause 7B, wherein the entry comprises an 8B-bit value, the first 4 bits of the 8B-bit value identify the first shift value, and the last 4 bits of the 8B-bit value identify the second shift value.

Clause 9B: The method of any of clauses 1B-8B, wherein the first shift value is updated at a higher rate than the second shift value.

Clause 10B: The method of any of clauses 1B-9B, wherein the received bin values correspond to a last M bins decoded by the context model, wherein M is an integer value greater than zero.

Clause 11B: The method of clause 10B, wherein M is equal to 1.

Clause 12B: A device for decoding video data, the device comprising: a memory configured to store video data; one or more processors implemented in circuitry and configured to: receive bin values according to a context model, wherein the context model includes one or more probability states and the bin values correspond to one or more syntax elements of the video data; determine a first shift value based on the received bin values; determine a second shift value based on the received bin values; update a first state variable based on the first shift value; update a second state variable based on the second shift value; determine, for a next bin to be decoded, a probability state for the context model based on the first state variable and the second state variable; context decode the next bin to be decoded based on the probability state; and determine values for the one or more syntax elements based on the received bin values and the context decoded next bin value.

Clause 13B: The device of clause 12B, wherein to determine the probability state for the context model based on the first state variable and the second state variable, the one or more processors are further configured to determine the probability state based on a weighted average of the first state variable and the second state variable.

Clause 14B: The device of clause 13B, wherein the one or more processors are further configured to: determine weights for calculating the weighted average of the first state variable and the second state variable based on the context model.

Clause 15B: The device of clause 14B, wherein the weights comprise a first weight and a second weight and a sum of the first weight and the second weight is equal to 1.

Clause 16B: The device of clause 14B or 15B, wherein the one or more processors are further configured to: determine values for the weights based on an identifier of the context model.

Clause 17B: The device of any of clauses 12B-16B, wherein to determine the first shift value based on the received bin values, the one or more processors are further configured to: identify an entry in a look up table based on an identifier of the context model and a last M bin values received, wherein M is an integer value greater than 1; and determine the first shift value based on the entry.

Clause 18B: The device of clause 17B, wherein the one or more processors are further configured to: determine the second shift value based on the entry.

Clause 19B: The device of clause 18B, wherein the entry comprises an 8B-bit value, the first 4 bits of the 8B-bit value identify the first shift value, and the last 4 bits of the 8B-bit value identify the second shift value.

Clause 20B: The device of any of clauses 12B-19B, wherein the first shift value is updated at a higher rate than the second shift value.

Clause 21B: The device of any of clauses 12B-20B, wherein the received bin values correspond to a last M bins decoded by the context model, wherein M is an integer value greater than zero.

Clause 22B: The device of clause 21B, wherein M is equal to 1.

Clause 23B: The device of any of clauses 12B-22B, wherein the device comprises a wireless communication device, further comprising a receiver configured to receive encoded video data.

Clause 24B: The device of clause 23B, wherein the wireless communication device comprises a telephone handset and wherein the receiver is configured to demodulate, according to a wireless communication standard, a signal comprising the encoded video data.

Clause 25B: The device of any of clauses 12B-24B, further comprising: a display configured to display decoded video data.

Clause 26B: The device of any of clauses 12B-25B, wherein the device comprises one or more of a camera, a computer, a mobile device, a broadcast receiver device, or a set-top box.

Clause 27B: An apparatus for decoding video data, the apparatus comprising: means for receiving bin values according to a context model, wherein the context model includes one or more probability states and the bin values correspond to one or more syntax elements of the video data; means for determining a first shift value based on the received bin values; means for determining a second shift value based on the received bin values; means for updating a first state variable based on the first shift value; means for updating a second state variable based on the second shift value; means for determining, for a next bin to be decoded, a probability state for the context model based on the first state variable and the second state variable; means for context decoding the next bin to be decoded based on the probability state; and means for determining values for the one or more syntax elements based on the received bin values and the context decoded next bin value.

Clause 28B: The apparatus of clause 27B, wherein determining the probability state for the context model based on the first state variable and the second state variable comprises determining the probability state based on a weighted average of the first state variable and the second state variable.

Clause 29B: The apparatus of clause 28B, further comprising: means for determining weights for calculating the weighted average of the first state variable and the second state variable based on the context model.

Clause 30B: The apparatus of clause 29B, wherein the weights comprise a first weight and a second weight and a sum of the first weight and the second weight is equal to 1.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving bin values according to a context model, wherein the context model includes one or more probability states and the bin values correspond to one or more syntax elements of the video data;
   determining a first shift value based on the received bin values;
   determining a second shift value based on the received bin values;
   updating a first state variable based on the first shift value;
   updating a second state variable based on the second shift value;
   determining, for a next bin to be decoded, a probability state for the context model based on the first state variable and the second state variable;
   context decoding the next bin to be decoded based on the probability state; and
   determining values for the one or more syntax elements based on the received bin values and the context decoded next bin value.

2. The method of claim 1, wherein determining the probability state for the context model based on the first state variable and the second state variable comprises determining the probability state based on a weighted average of the first state variable and the second state variable.

3. The method of claim 2, further comprising:
   determining weights for calculating the weighted average of the first state variable and the second state variable based on the context model, wherein the weights comprise a first weight and a second weight, and the first weight and second weight are different.

4. The method of claim 3, wherein a sum of the first weight and the second weight is equal to 1.

5. The method of claim 3, further comprising:
   determining values for the weights based on an identifier of the context model.

6. The method of claim 1, wherein determining the first shift value based on the received bin values comprises:
   identifying an entry in a look up table based on an identifier of the context model and a last M bin values received, wherein M is an integer value greater than 1; and
   determining the first shift value based on the entry.

7. The method of claim 6, further comprising:
   determining the second shift value based on the entry.

8. The method of claim 7, wherein the entry comprises an 8-bit value, the first 4 bits of the 8-bit value identify the first shift value, and the last 4 bits of the 8-bit value identify the second shift value.

9. The method of claim 1, wherein the first shift value is updated at a higher rate than the second shift value.

10. The method of claim 1, wherein the received bin values correspond to a last M bins decoded by the context model, wherein M is an integer value greater than zero.

11. The method of claim 10, wherein M is equal to 1.

12. A device for decoding video data, the device comprising:

a memory configured to store video data;
one or more processors implemented in circuitry and configured to:
receive bin values according to a context model, wherein the context model includes one or more probability states and the bin values correspond to one or more syntax elements of the video data;
determine a first shift value based on the received bin values;
determine a second shift value based on the received bin values;
update a first state variable based on the first shift value;
update a second state variable based on the second shift value;
determine, for a next bin to be decoded, a probability state for the context model based on the first state variable and the second state variable;
context decode the next bin to be decoded based on the probability state; and
determine values for the one or more syntax elements based on the received bin values and the context decoded next bin value.

13. The device of claim 12, wherein to determine the probability state for the context model based on the first state variable and the second state variable, the one or more processors are further configured to determine the probability state based on a weighted average of the first state variable and the second state variable.

14. The device of claim 13, wherein the one or more processors are further configured to:
determine weights for calculating the weighted average of the first state variable and the second state variable based on the context model, wherein the weights comprise a first weight and a second weight, and the first weight and second weight are different.

15. The device of claim 14, wherein a sum of the first weight and the second weight is equal to 1.

16. The device of claim 14, wherein the one or more processors are further configured to:
determine values for the weights based on an identifier of the context model.

17. The device of claim 12, wherein to determine the first shift value based on the received bin values, the one or more processors are further configured to:
identify an entry in a look up table based on an identifier of the context model and a last M bin values received, wherein M is an integer value greater than 1; and
determine the first shift value based on the entry.

18. The device of claim 17, wherein the one or more processors are further configured to:
determine the second shift value based on the entry.

19. The device of claim 18, wherein the entry comprises an 8-bit value, the first 4 bits of the 8-bit value identify the first shift value, and the last 4 bits of the 8-bit value identify the second shift value.

20. The device of claim 12, wherein the first shift value is updated at a higher rate than the second shift value.

21. The device of claim 12, wherein the received bin values correspond to a last M bins decoded by the context model, wherein M is an integer value greater than zero.

22. The device of claim 21, wherein M is equal to 1.

23. The device of claim 12, wherein the device comprises a wireless communication device, further comprising a receiver configured to receive encoded video data.

24. The device of claim 23, wherein the wireless communication device comprises a telephone handset and wherein the receiver is configured to demodulate, according to a wireless communication standard, a signal comprising the encoded video data.

25. The device of claim 12, further comprising:
a display configured to display decoded video data.

26. The device of claim 12, wherein the device comprises one or more of a camera, a computer, a mobile device, a broadcast receiver device, or a set-top box.

27. An apparatus for decoding video data, the apparatus comprising:
means for receiving bin values according to a context model, wherein the context model includes one or more probability states and the bin values correspond to one or more syntax elements of the video data;
means for determining a first shift value based on the received bin values, wherein the means for determining the first shift value based on the received bin values comprises:
means for determining a first predefined shift value based on the context model;
means for determining a first shift delta value based on the received bin values; and
means for adding the first predefined shift value to the first shift delta value to determine the first shift value;
means for determining a second shift value based on the received bin values, wherein the means for determining the second shift value based on the received bin values comprises:
means for determining a second predefined shift value based on the context model;
means for determining a second shift delta value based on the received bin values; and
means for adding the second predefined shift value to the second shift delta value to determine the second shift value;
means for updating a first state variable based on the first shift value;
means for updating a second state variable based on the second shift value;
means for determining, for a next bin to be decoded, a probability state for the context model based on the first state variable and the second state variable;
means for context decoding the next bin to be decoded based on the probability state; and
means for determining values for the one or more syntax elements based on the received bin values and the context decoded next bin value.

28. The apparatus of claim 27, wherein determining the probability state for the context model based on the first state variable and the second state variable comprises determining the probability state based on a weighted average of the first state variable and the second state variable.

29. The apparatus of claim 28, further comprising:
means for determining weights for calculating the weighted average of the first state variable and the second state variable based on the context model, wherein the weights comprise a first weight and a second weight, and the first weight and second weight are different.

30. The apparatus of claim 29, wherein a sum of the first weight and the second weight is equal to 1.

* * * * *